United States Patent
Amerson

(10) Patent No.: US 9,863,656 B2
(45) Date of Patent: Jan. 9, 2018

(54) ROOM SENSOR USING CHARGED PARTICLE AIRFLOW

(75) Inventor: Randall J. Amerson, Spring Grove, IL (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 1382 days.

(21) Appl. No.: 12/378,814

(22) Filed: Feb. 19, 2009

(65) Prior Publication Data

US 2010/0210203 A1 Aug. 19, 2010

(51) Int. Cl.
*F24F 13/08* (2006.01)
*F24F 11/00* (2006.01)
*G01K 1/08* (2006.01)
*G01K 13/02* (2006.01)

(52) U.S. Cl.
CPC .............. *F24F 11/001* (2013.01); *G01K 1/08* (2013.01); *G01K 13/02* (2013.01); *G01K 2013/024* (2013.01)

(58) Field of Classification Search
USPC ............... 454/258, 254, 256, 184; 236/44 C; 96/15; 374/208
See application file for complete search history.

(56) References Cited

U.S. PATENT DOCUMENTS

| | | | | |
|---|---|---|---|---|
| 2,160,740 A * | 5/1939 | Hutchins | ................... | G01K 1/16 236/DIG. 19 |
| 2,273,375 A * | 2/1942 | Ray | ................... | 337/79 |
| 2,765,975 A * | 10/1956 | Lindenblad | ............. | F04D 33/00 310/308 |
| 2,815,824 A * | 12/1957 | Armstrong | ................ | B03C 3/36 96/72 |
| 3,267,860 A * | 8/1966 | Brown | ................. | H02N 11/006 417/48 |
| 3,374,941 A * | 3/1968 | Okress | ..................... | F04D 33/00 315/111.91 |
| 3,638,058 A * | 1/1972 | Fritzius | ................... | H01T 23/00 313/359.1 |
| 3,660,968 A * | 5/1972 | Dyla | ......................... | B03C 3/40 96/71 |
| 4,141,496 A * | 2/1979 | Duchek | .................. | F24F 11/053 236/49.4 |
| 4,210,847 A * | 7/1980 | Shannon | .................. | H05H 1/48 315/111.91 |
| 4,282,591 A * | 8/1981 | Andreuccetti | .................. | 368/10 |
| 4,659,236 A * | 4/1987 | Hobbs | ........................... | 374/208 |
| 5,008,775 A * | 4/1991 | Schindler et al. | ....... | 361/679.46 |
| 5,114,070 A * | 5/1992 | Lilja | .................. | G05D 23/1905 236/49.3 |
| 5,381,950 A * | 1/1995 | Aldridge | ...................... | 236/1 R |
| 5,601,636 A * | 2/1997 | Glucksman | ........... | F24F 3/1603 55/356 |
| 5,661,299 A * | 8/1997 | Purser | ................. | H01J 49/0086 250/281 |

(Continued)

*Primary Examiner* — Gregory Huson
*Assistant Examiner* — Martha Becton

(57) ABSTRACT

A sensor assembly has a housing with at least two ventilation openings, a sensing element, a passage within the housing, and an electrokinetic transducer. The passage extends between the at least two ventilation openings, and is in fluid communication with the sensing element. The electrokinetic transducer is configured to move air in a first direction with the passage.

10 Claims, 2 Drawing Sheets

(56) References Cited

U.S. PATENT DOCUMENTS

| | | | | |
|---|---|---|---|---|
| 5,861,703 | A * | 1/1999 | Losinski | F04D 33/00 257/E23.099 |
| 5,958,112 | A * | 9/1999 | Nojima | B03C 3/32 55/359 |
| 6,032,867 | A * | 3/2000 | Dushane et al. | 236/51 |
| 6,082,894 | A * | 7/2000 | Batko | 374/142 |
| 6,116,512 | A * | 9/2000 | Dushane | F24D 19/10 165/238 |
| 6,163,098 | A * | 12/2000 | Taylor et al. | 310/308 |
| 6,312,507 | B1 * | 11/2001 | Taylor | A01K 1/0107 119/165 |
| 6,709,155 | B2 * | 3/2004 | Knittel | B60H 1/00792 236/DIG. 12 |
| 7,182,805 | B2 * | 2/2007 | Reaves | B03C 3/011 95/7 |
| 7,236,344 | B2 * | 6/2007 | McCullough | H01T 23/00 361/226 |
| 7,410,532 | B2 * | 8/2008 | Krichtafovitch | H01J 49/04 250/423 R |
| 2006/0112955 | A1 * | 6/2006 | Reaves | F24B 1/1808 126/530 |
| 2006/0113398 | A1 * | 6/2006 | Ashworth | 236/44 C |
| 2006/0125648 | A1 * | 6/2006 | Young | 340/628 |
| 2008/0144302 | A1 * | 6/2008 | Rosenblatt | 361/809 |

* cited by examiner

ROOM SENSOR USING CHARGED PARTICLE AIRFLOW

FIELD OF THE INVENTION

The present invention relates to sensors for use in buildings, and particularly to sensors that sense media within a room for the purpose of environmental monitoring and/or control.

BACKGROUND OF THE INVENTION

Building automation systems or building control systems are systems that regulate, monitor and/or control various aspects of building operation and environment. Common examples of building automation systems include heating, ventilation and air conditioning ("HVAC") systems, fire safety systems, and security systems. Residential spaces typically have relatively simple HVAC, fire safety and/or security systems, while large commercial or industrial properties can have thousands of elements, layers of control devices, and extensive communication networks and layers.

One of the major operations of an HVAC system or similar building automation system is to sense media and control aspects of the mechanical building structures based on the sensed properties of the media. For example, the sensed media in a room or other occupied space is the air. In a typical case, the air temperature in a room is sensed for the purposes of determining whether more or less chilled air should be admitted to the room in order to achieve a desired temperatures. The air may also be provided to a sensor for the purpose of determining the $CO_2$, CO, or volatile organic compounds are present for the purposes of determining ventilation needs. Humidity and other aspects of the ambient air may also be sensed. In any event, the building automation system can control the operation of ventilation dampers, heating or cooling coils, and/or air handling units on the basis of such sensor data.

To perform the media sensing in building automation systems, it is known mount sensor units on the wall. These so-called wall sensors may or may not be combined with a control mechanism, such as is the case with a home thermostat. By contrast, in large commercial building automation systems, it is more likely that the sensor has the sole purpose of sensing media.

One of the issues regarding wall sensors in building automation systems relates to their bulk. Large boxy sensors typically do not match any décor within a room, and can sometimes even snag clothing, or injure a moving elbow or head. One desirable goal in the build automation system industry is to reduce the extent to which the sensor protrudes from the wall. The extent of protrusion from the wall is referred to herein as the "height". However, there is a limit to how much the height of sensors may be reduced. In particular, as the wall sensors get thinner, it becomes more difficult to bring room air into the sensor housing for measurement by the sensing element. To this end, the air flow at or immediately adjacent to a wall surface is very low or even stagnant.

Accordingly, there is a tension between the desire to reduce the height (i.e. extension from the wall) of a sensor and the need for the height to allow for more air to flow to the sensor.

SUMMARY

The present invention addresses the above needs, as well as others by providing a electrokinetic transducer to assist in providing air flow through a sensor housing. The electrokinetic transducer in some embodiments uses electrodes to charge and move airborne particles in order to create an air flow.

A first embodiment is a sensor assembly having a housing with at least two ventilation openings, a sensing element, a passage within the housing, and an electrokinetic transducer. The passage extends between the at least two ventilation openings, and is in fluid communication with the sensing element. The electrokinetic transducer is configured to move air in a first direction with the passage.

The embodiment described above may have a low profile because it does not rely solely on the ambient air currents to pass air from a room through a sensor housing.

The above-described features and advantages, as well as others, will become more readily apparent to those of ordinary skill in the art by reference to the following detailed description and accompanying drawings.

DETAILED DESCRIPTION

Figure 2:
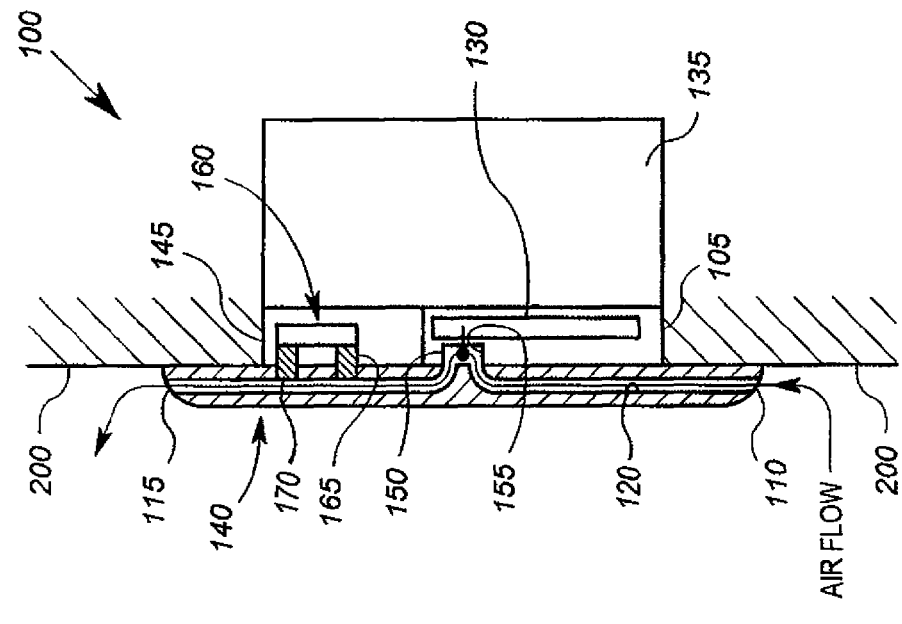
FIG. 2 shows a cutaway side view of the sensor assembly of FIG. 1 shown in context within a wall.
Figure 1:
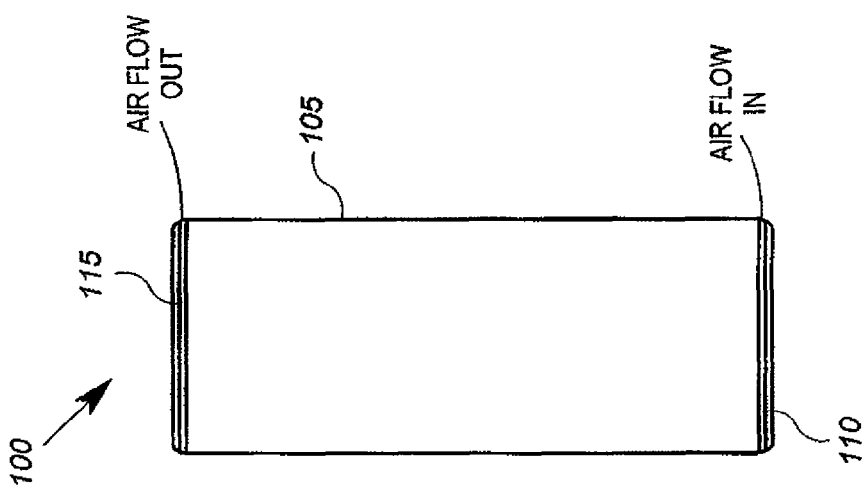
FIG. 1 shows a front plan view of a sensor assembly in accordance with an exemplary embodiment of the invention.

FIG. 1 shows a front plan view of a sensor assembly 100 in accordance with an exemplary embodiment of the invention, and FIG. 2 shows a cutaway side view of the sensor assembly 100. The description of the sensor assembly 100 is made with reference to both FIGS. 1 and 2 simultaneously.

The sensor assembly 100 includes a housing 105, first and second openings 110, 115, a passage 120, a sensor 125, a printed circuit assembly (PCA) 130, an electrokinetic transducer assembly 160, and a power and support assembly 135. In FIG. 2, the assembly 100 is installed within a wall 200.

The housing 105 includes an exposed portion 140 and a recessed portion 145. The exposed portion 140 in this embodiment has a generally rectangular shape with rounded corners. The exposed portion 140 extends outward from the outer surface of the wall 200. Thus, the exposed portion 140 preferably has a low profile as shown in FIG. 2. The first opening 110 in this embodiment is formed near the bottom of the exposed portion 140, and the second opening 115 is formed near the top of the exposed portion 140. For reasons that will be discussed below in detail, the first opening 110 preferably extends substantially all of the way across the bottom of the housing 105 and the second opening 115 preferably extends all of the way across the top of the housing 105. In some embodiments, the openings 110 and 115 may be segmented by vertical support ribs or or louvers, not shown. However, such structures can reduce air flow by reducing the overall opening size and/or introducing eddy currents or the like.

The passage 120 extends substantially between the first opening 110 and the second opening 115. As shown in FIG. 2, the passage 120 in this embodiment is approximately 30% to 50% of the height/thickness of the exposed portion 140. The passage 120 has a width that is nearly the width of the housing 105, but does not extend through the sides of the housing 105. The passage 120 is configured to communicate sensed media (e.g. air) from the first opening 110 to the second opening 115 within the interior of the sensor housing 105. The passage 120 extends more or less linearly from the first opening 110 to the second opening 115 in a direction that is parallel to the exposed surface of the housing 105. However, the passage 120 includes a jog 150 that extends into the interior portion 145 of the housing 105. As will be discussed below, the jog 150 creates a chamber 155 in which the sensor element 125 is located.

The interior portion 145 of the housing 105 has a greater thickness or height than the exposed portion 140. The interior portion 145 is the portion of the housing 105 that sits within the wall 200. By "within the wall", it is meant that the location is at or below the outer surface of the wall 200, such that it does not protrude into the room space. The interior portion 145 contains the sensor element 125, the printed circuit assembly (PCA) 130, and the electrokinetic assembly 160. The power and support assembly 135 may also be contained within the interior portion 145, or may have a separate housing, not shown, that is also disposed within the outer surface of the wall 200.

The sensor element 125 may suitably be any sensor element used in commercial or residential room temperature sensor devices. In some embodiments, the sensor element 125 may include or comprise a $CO_2$ sensor, a CO sensor, a volatile organic compound sensor, a humidity sensor, a smoke sensor, and/or any combination thereof. The sensor element 125 is located with a chamber 155 that forms a part of and/or is in fluid communication with the passage 150. In this embodiment, the chamber 155 is disposed within the interior portion 145.

Figure 3:
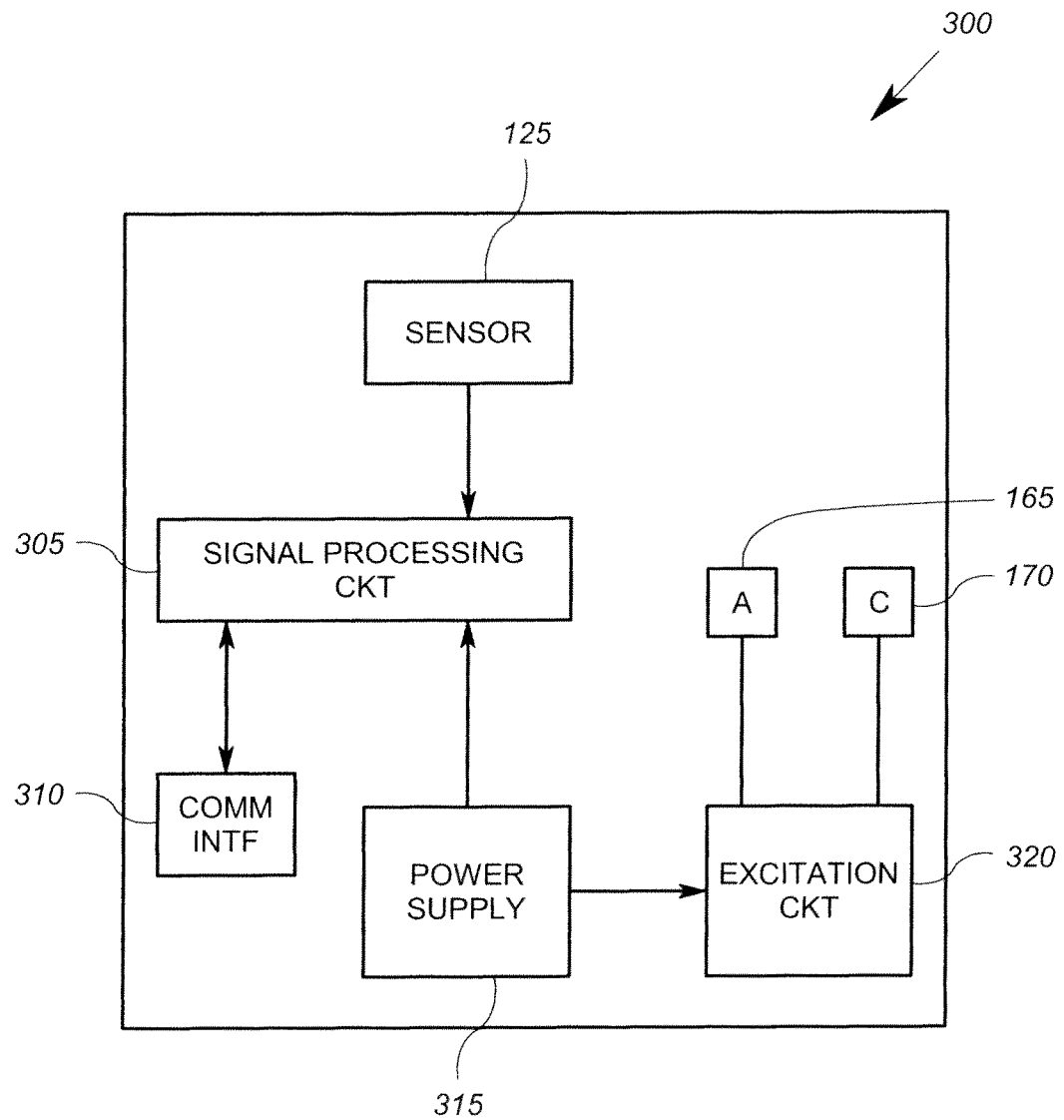
FIG. 3 shows a schematic block diagram of an exemplary circuit that may be used in the sensor assembly of FIG. 1.

The PCA 130 is a small circuit board or assembly that contains all or most of the processing and communication electronics of the sensor assembly 100. For example, the PCA 130 may include signal processing circuits that convert sensor signals (received from the sensor element 125) into digital or analog values having a format compatible with that of the HVAC system to which the sensor assembly 100 is connected. The PCA 130 may also include communication circuits for communicating data, either wirelessly or via a wired connection, to a nearby or remote element of the HVAC system, such as a control panel, not shown. FIG. 3, discussed further below, shows a sensor signal processing circuit 305 and a communication circuit 310 that may be contained on the PCA 130.

The electrokinetic transducer 160 is a device that employs charged molecule airflow technology to move air. Such technology has been used, for example, on a larger scale, to create so-called ionic air purifiers or cleaners. The electrokinetic transducer assembly 160 includes an anode 165 that is configured to ionize particles in the vicinity thereof, and a cathode 170 that is configure to attract the ionized particles from the vicinity of the anode 165 toward the cathode 170.

The power and support assembly 135 is a device that is configured to provide the voltages necessary for the operation of the electrokinetic transducer 160. Because these voltages are often quite a bit higher than those required for the sensor circuits on the PCA 130, the power and support assembly 135 can be segregated therefrom. In some embodiments, the power and support assembly 135 can be separate mounted within the wall 200 at a position that is spaced apart from interior portion 145 of the housing 105. External location of the power and support assembly 135 can also minimize the influence of any heat generated by the requisite power supplies on the temperature measurement operation within the housing 105.

In the operation of the sensor assembly 100 of FIGS. 1 and 2, the sensor assembly 100 is first provided in the wall 200 such that the exposed portion 140 extends outward from the surface of the wall 200, and that the interior portion 145 is located in a suitably sized opening in the wall 200. The interior portion 145 may in some cases extend through the wall to an interior plenum or empty space between walls. In this embodiment, the power and support assembly 135 is disposed in the vicinity of the interior portion 145, and in any event within the wall 200.

When excitation voltages are supplied to the anode 165 and cathode 170 of the electrokinetic transducer 160, the anode 165 operates to ionize or charge particles within the air disposed proximate the anode 165. At the same time the cathode 170 operates to attract the charged particles from the anode 165 to the cathode 170. The movement of the particles creates an air current in the direction from the anode 165 to the cathode 170. This air current creates a pressure drop near the anode 165 and a pressure increase near the cathode 170. This relative pressure differential is equalized by incoming air from the first opening 110, and expulsion of air from the second opening 115. The resulting airflow thus flows from the room into the first opening 110, into the passage 120, through the passage 120 via the chamber 155, past the anode 165 (which charges particles in the new air), past the cathode 170 (which further attracts the charged particles), and out of the second opening 115. As a consequence, new air from the room is regularly moved by the sensor 125 located within the chamber 155. The sensor element 125 may thus perform sensing operations on a continual stream of fresh air from the room.

In installing the sensor assembly 100, it may be advantageous to identify the likely ambient airflow past the location of the sensor assembly 100 so that the anode 165 and cathode 170 can be arranged to cause airflow that cooperates with the ambient airflow.

It will be appreciated that variants of the structure of the sensor assembly 100 of FIGS. 1 and 2 may be employed. For example, multiple anode and cathodes may be used, or may be placed differently within the housing 105. The shape and dimensions of the passage may vary based on the selection of the anode and cathode arrangement. Other arrangements that assist in airflow, such as miniature fans or the like, may be used in combination.

FIG. 3 shows a schematic diagram of the electrical components that may be used in the embodiment of FIGS. 1 and 2. The sensor circuit 300 includes the sensor 125, a signal processing circuit 305, a communication circuit 310, a power supply 315, an excitation circuit 320, the anode 165 and the cathode 170. The signal processing circuit 305 is the circuit that detects signals generated by the sensor element 125 and converts them to the format suitable for communication within the HVAC system. Such circuits are well-known. The communication circuit 310 forms an interface to the building automation system, not shown. The communication circuit 310 may suitably effectuate communication of the sensor information to a remote HVAC device such as a controller, not shown. Various communication circuits 310 for use with HVAC and other building automation sensors are well known, and can be implemented to provide wired or wireless communications to other elements of a building automation system.

The excitation circuit 320 is a circuit configured to provide the voltage pulses necessary to cause the anode 165 to ionize particles, and to cause the cathode 170 to attract such particles. Suitable excitation circuits for such purposes are known. The power supply 315 includes one or more circuits that provide power to the excitation circuit 320, the communication circuit 310, and the signal processing circuit 305. The excitation circuit 320 will typically require a much higher voltage than the communication circuit 310 and the signal processing circuit 305. As a result, the power supply circuit 315 may actually contain two power supplies, or may be a two-output power supply.

As discussed above, the communication circuit 310 and the sensor signal processing circuit 305 may be disposed on the PCA 130 of FIGS. 1 and 2. The power supply 315 may suitably be provided in the power and support assembly 135. The excitation circuit 320 may be separately mounted within the housing 105, located within the power and support assembly 135, or a combination of both.

It will be understood that the above described embodiments are merely exemplary, and that those ordinary skill in the art may readily devise their own implementations and modifications that incorporate the principles of the present invention and fall within the spirit and scope thereof. In one embodiment, the sensor element 125, the sensor signal processing circuit 305 and the communication circuit 310 may be implemented on a sensor module that employs MEMS technology for one or more those purposes. Such a MEMs-based module would be place in the chamber 155 of FIG. 2.

I claim:

1. A sensor assembly comprising:
   a housing including an interior portion adapted to sit within a wall and an exposed portion adapted to extend outward from an outer surface of the wall, the exposed portion including at least two ventilation openings at opposed ends of the exposed portion and having a passage with closed sides extending therebetween, wherein the passage defines a jog where the passage partially extends from the exposed portion into the interior portion, and wherein the jog at the interior portion includes a sensing element therein, and wherein said passage is in fluid communication with the sensing element; and
   an electrokinetic transducer configured to move air in a first direction with the passage.

2. The sensor assembly of claim 1, wherein a first of the ventilation openings extends substantially across a first edge of the housing, and a second of the ventilation openings extends substantially across a second edge of the housing that is opposite the first edge.

3. The sensor assembly of claim 1, wherein the passage extends substantially parallel to the substantially planar outer surface of the housing.

4. The sensor assembly of claim 1, wherein the electrokinetic transducer assembly includes an anode disposed within the passage and a cathode disposed within the passage.

5. The sensor assembly of claim 1, wherein the sensing element comprises at least one of the group consisting of: a temperature sensor, a humidity sensors, a carbon dioxide sensor and a volatile organic compound sensor.

6. A sensor assembly comprising:
   a housing including an internal housing portion adapted to sit within a wall and an exposed housing portion adapted to extend outward from an outer surface of the wall, and at least two ventilation openings at opposite ends of the exposed housing portion;
   a passage having a substantially uniform width and a substantially uniform thickness and extending between the at least two ventilation openings of the exposed housing portion and partially into the internal housing portion, and wherein the passage defines a sensing chamber along the passage where the passage extends from the exposed housing portion into the internal housing portion;
   a sensing element disposed in the sensing chamber and in fluid communication with the passage; and
   an electrokinetic transducer configured to move air in a first direction with the passage.

7. The sensor assembly of claim 6, wherein a first of the ventilation openings extends substantially across a first edge of the housing, and a second of the ventilation openings extends substantially across a second edge of the housing that is opposite the first edge.

8. The sensor assembly of claim 6, wherein the passage extends substantially parallel to an elongate surface of the housing.

9. The sensor assembly of claim 6, wherein the electrokinetic transducer assembly includes an anode disposed within the passage and a cathode disposed within the passage.

10. The sensor assembly of claim 6, wherein the sensing element comprises at least one of the group consisting of: a temperature sensor, a humidity sensors, a carbon dioxide sensor and a volatile organic compound sensor.

* * * * *